June 10, 1952  C. E. LEPPER  2,599,715
NUT GATHERER

Filed July 17, 1948                                                                3 Sheets-Sheet 1

INVENTOR.
CHARLES E. LEPPER
BY Lyon+Lyon
ATTORNEYS

June 10, 1952      C. E. LEPPER      2,599,715
NUT GATHERER
Filed July 17, 1948      3 Sheets-Sheet 2
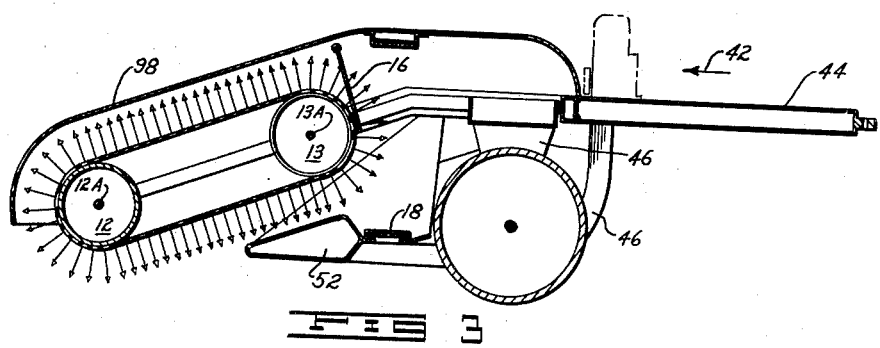
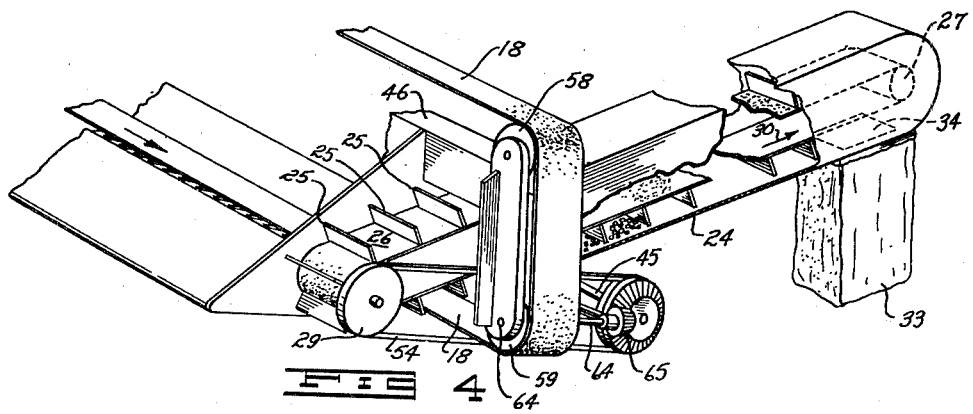
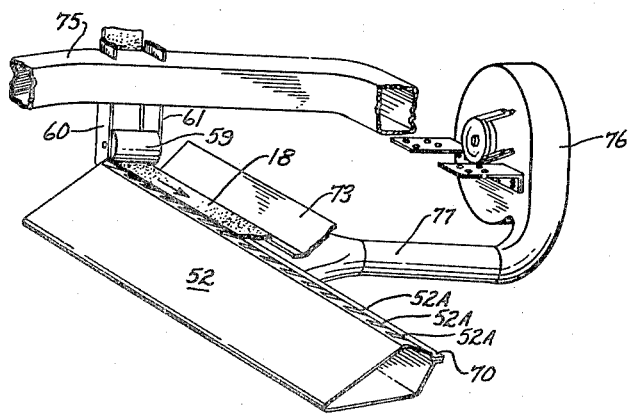
INVENTOR.
CHARLES E. LEPPER
BY *Lyon & Lyon*
ATTORNEYS June 10, 1952　　　C. E. LEPPER　　　2,599,715
NUT GATHERER
Filed July 17, 1948　　　　　　　　　　3 Sheets-Sheet 3
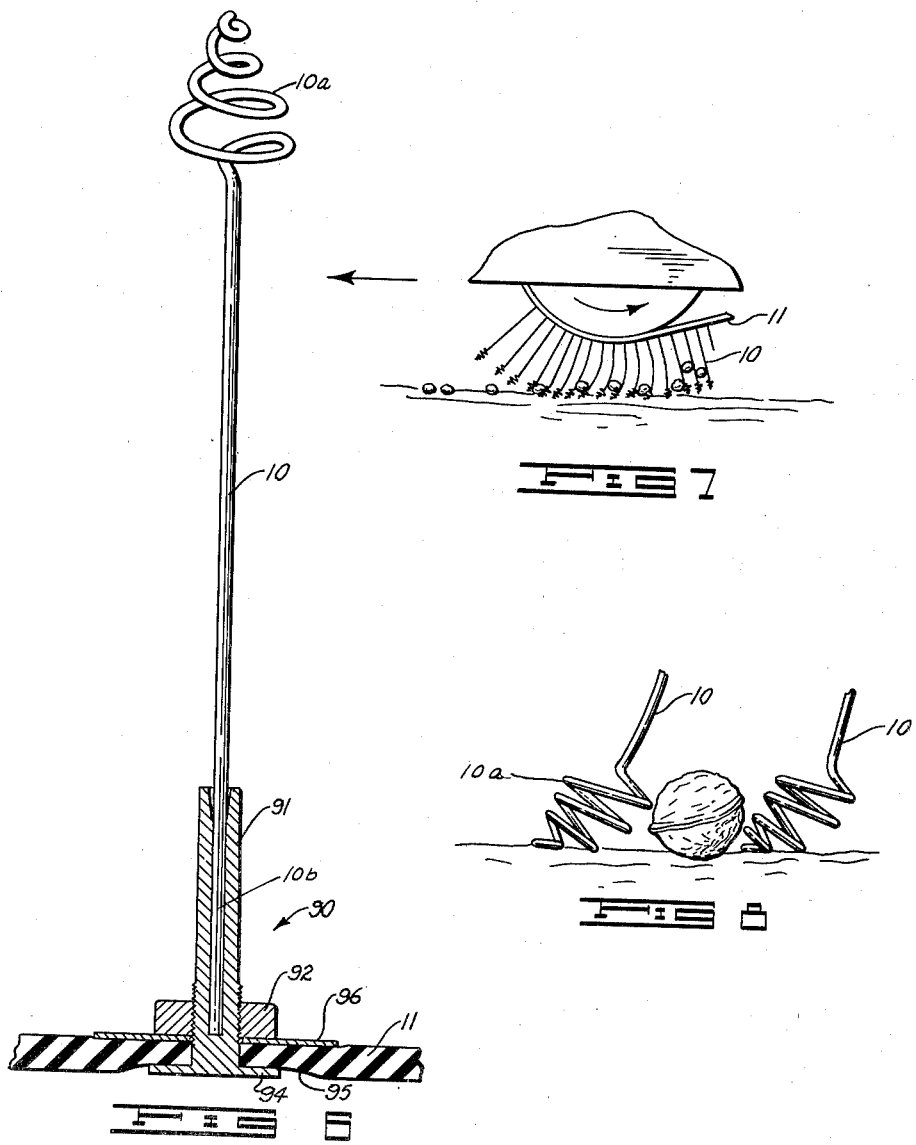
INVENTOR.
CHARLES E. LEPPER
BY Lyon & Lyon
ATTORNEYS Patented June 10, 1952

2,599,715

UNITED STATES PATENT OFFICE 2,599,715

NUT GATHERER

Charles E. Lepper, Ventura, Calif.

Application July 17, 1948, Serial No. 39,270

4 Claims. (Cl. 56—328)

The present invention relates to an improved harvester particularly useful for harvesting walnuts from the ground.

An object of the present invention is to provide an improved harvester, the basic features of which may be embodied either in a manually propelled unit, or in a tractor propelled unit having sufficient capacity to carry the harvested nuts along a long row of trees without leaving track ditches through the field.

Another object of the present invention is to provide an improved harvester incorporating a novel arrangement of fingers mounted on an endless belt for assuring efficient harvesting of substantially all of the walnuts over which the harvester travels.

Still another object of the present invention is to provide an improved harvester incorporating novel fingers mounted on an endless belt which are opened and closed at advantageous positions as the belt travels to accomplish their intended purpose of picking nuts from the ground, carrying the nuts to a position above where they are deposited, and at such position opening to allow the harvested nuts to fall onto a traveling conveyer belt or into a sack.

Yet another object of the present invention is to provide an improved harvester incorporating novel debris separation means in the form of a conveyer belt having associated therewith means for directing a stream of air once the material is carried on the belt.

Still another object of the present invention is to provide an improved harvester incorporating novel means whereby leaves may be blown away before the walnuts are harvested from the ground.

Still a further object of the present invention is to provide an improved harvester which is characterized by its simplicity, and ease of manufacture in accordance with present day mass production methods.

Yet another object of the present invention is to provide an improved harvester which may be conveniently operated and serviced by relatively unskilled personnel and which is not too likely to require extensive maintenance.

Still a further object of the present invention is to provide an improved harvester incorporating novel fingers whose depth of penetration in the ground may be easily adjusted and is practically the same as the harvester travels over uneven terrain.

Still another object of the present invention is to provide an improved harvester in which the picking elements, comprising fingers, are mounted on a belt in such a manner as to spread the picking elements as they pass around a belt pulley at the time the picking elements are presented along the surface of the ground to allow walnuts to pass within the open picking elements after which the picking elements move in a substantially straight line to another pulley where the harvested walnuts may fall from the fingers as they again open in passing around the second pulley.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 3 is a sectional view taken substantially on the line 3—3 of Figure 1.

Figure 4 is a perspective view of a portion of the machine shown in Figure 1.

Figure 5 is a perspective view of another portion of the machine shown in Figure 1.

Figure 6 is an enlarged view of one of the resilient finger elements mounted on the belt in the machine shown in Figure 1.

Figure 7 is a view showing the manner in which rows of fingers open as they travel around a pulley and then penetrating action in the ground.

Figure 8 is a view showing the manner in which the spiral spring ends of the fingers are compressed as they penetrate into the ground.

Figure 1:
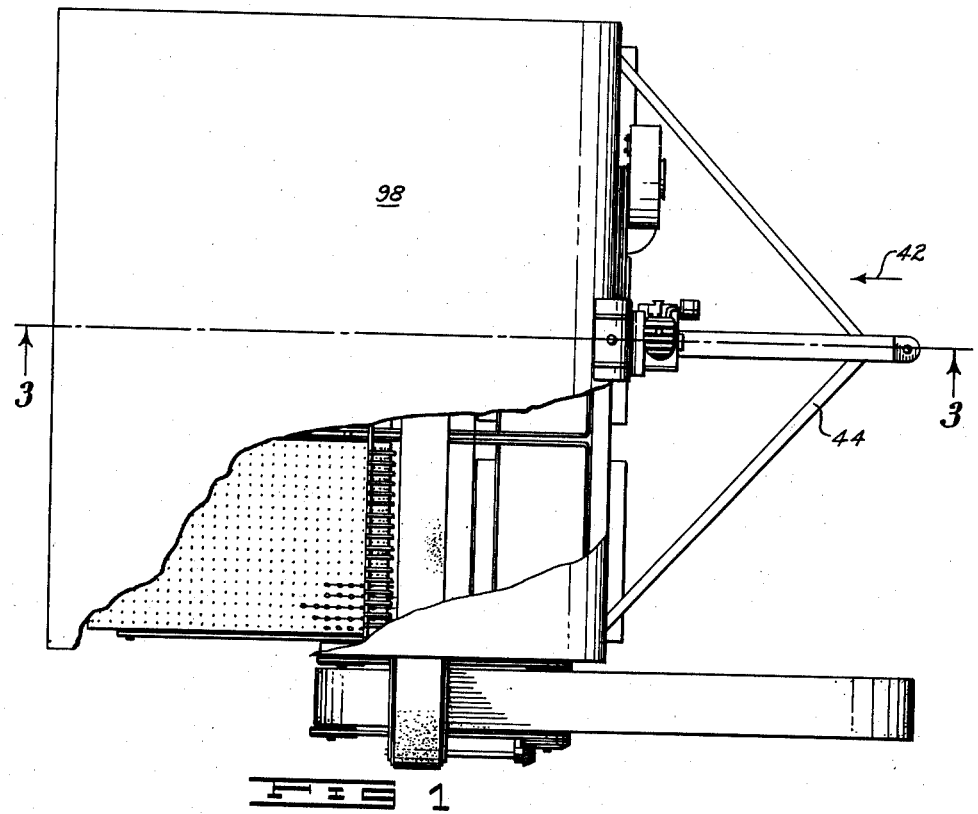
Figure 1 is a top plan view of a harvester embodying the present invention with a portion of its casing broken away to show internal construction.

The harvester shown herein serves to pick up walnuts from the ground by fingers 10 mounted on an endless belt 11 which passes over an idler pulley 12 and driven pulley 13. After being picked from the ground the walnuts are carried generally upward by the fingers 10 over pulley 13 where they are stopped by the stripper fingers 16 disposed between rows of fingers 10 to allow the walnuts to fall onto the endless conveyer belt 18 which travels in a direction transverse to the direction of travel of the harvesting vehicle. The walnuts travel on such endless belt 18 adjacent an air manifold 22 from which issues a stream of air to clean the belt 18 of leaves, sand, and other debris. The walnuts are then transferred or swept from the transversely moving belt 18 onto an inclined plane or loading platform 24 by flap members 25 mounted at spaced intervals on the endless belt 26 which passes over the idler pulley 27 and driven pulley 29. These flap members in their continued upward motion in the direction indicated by the arrow 30 in Figure 4 sweep the walnuts on and up to the upper end of the loading platform 24 from where they may fall through aperture 34 in the loading platform into a releasably positioned burlap bag or sack 33.

The harvester has a pair of ground-engaging and supporting wheels 40 and may be propelled either manually in the direction indicated by the arrow 42 in Figure 3 or it may be propelled by a tractor hitched to the tongue 44 attached to the harvester chassis, the wheels being journaled on the axle 45 which is supported on the chassis or frame 46.

Figure 2:
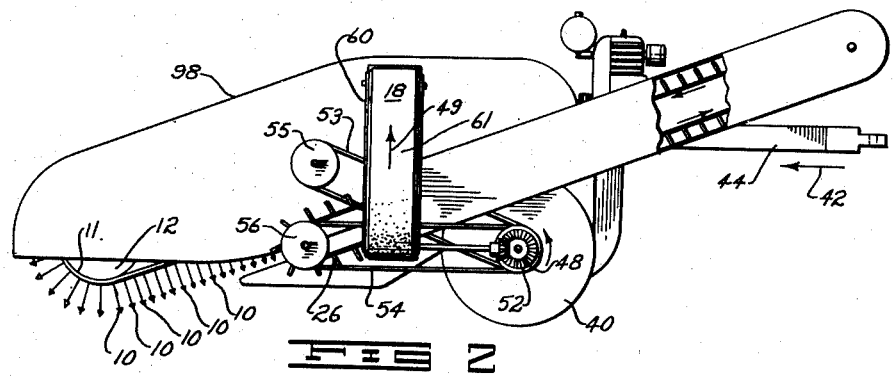
Figure 2 is a view in side elevation of the unit shown in Figure 1.

Also, mounted on the axle 45 for rotation with the wheels 40 are the bevel gears 48 which serve to drive the belt 18 in the direction indicated by the arrow 49 in Figure 2 and the pulley member 52 which serves to drive the belts 53, 54 and corresponding pulleys 55, 56 which respectively drive belts 11 and 26.

The belt 18 travels in a general rectangular path and passes over a pair of upper pulley members 58 and a pair of lower pulley members 59, these pulley members being journaled for rotation on axles having their opposite ends journaled for rotation without end play in vertically extending frame members 60, 61 attached to frame 46 and arranged in pairs on opposite sides of the harvester with one of the axles 64 having a bevel gear 65 thereon co-operating with the bevel gear 48 to drive belt 18 synchronously with motion of the harvester.

The pulley members 12 and 13 are journaled for rotation on shafts 12A, 13A respectively which are journaled for rotation without end play on the harvester chassis or frame with a line joining the center of shafts 12A, 13A tilted with respect to the horizontal at an angle whose tangent is in the order of .275. This angle which corresponds to the inclination of the travel of belt 11 is somewhat critical in determining the operation of fingers 10 as is the diameter of pulley 12 and 13. The diameter of the pulleys 12, 13 may be in the order of 5 inches and the spacing between pulleys 12, 13 in the order of 20 inches.

The belt 11 travels parallel to the manifold 52 having a series of orifices 52A therein extending along its length for blowing leaves, dirt and other debris from the belt, the belt in its travel along the manifold being supported along its opposite edges on the lip 70 of the manifold 52 and on the air baffle member 73, the baffle member 73 and manifold being stationarily mounted at their opposite ends on harvester frame members.

Air is supplied to the manifold 52 from the inlet conduit 75 after being compressed in the motor driven blower 76 and delivered to outlet conduit 77, all of which are in communication with the manifold 52 and stationarily mounted on harvester frame members.

Another feature of the present invention is the structure of the fingers shown in Figures 6, 7 and 8. These fingers 10 comprise straight wires or spring rods each having its free end formed as a conically shaped spiral spring-like ground engaging element 10a while the other inner end 10b of the wire is held in a clamp 90 mounted on the belt 11.

The clamp 90 comprises a split sleeve portion 91 whose component parts are drawn together by the nut 92 to clamp the end of wire within such portion 91. The nut 92 serves also to mount the clamp 90 on the belt; and for this purpose the sleeve 91 has a flange 94 recessed within a reentrant portion 95 of the belt 11 which is drawn against the belt simultaneously with the washer 96 on the opposite side of the belt when the nut 92 is tightened. Thus, when the nut 92 is tightened, the finger 10 is clamped and simultaneously the clamp 90 is fastened to the belt 11.

While the action of the spiral spring portions at the ends of the fingers 10 is not too clear, it has been observed that their action is advantageous and results in efficient operation. Apparently, the spring portions are slightly compressed as they engage the ground and just as they leave the ground the energy stored in such spring portions cause the ends of the fingers to snap up into walnut engaging position to entrap a walnut between it and an adjacent finger.

The axes of fingers 10 are disposed a distance apart slightly greater than the diameter of a walnut in mutually perpendicular directions to constitute a plurality of rows along the belt, between each of which rows is disposed the previously mentioned stripper fingers 16. The convolutions of coils 10a which form the ground engaging elements are closer than the diameter of the walnuts so that they do not enter the coils but are retained between adjacent coils.

Another feature of the present invention is that it is substantially counterbalanced about the axis of the axle for wheels 40 so that the fingers 10 passing over the pulleys 12 engage the ground with relatively little pressure while the vehicle tongue 44 is attached to and shoved by a tractor (not shown).

Preferably, the moving parts of the vehicle are protected against the weather elements by a cover member 98 which also gives protection against accidents to the operating personnel.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a harvesting apparatus of the character described, a wheeled vehicle having an endless belt, said endless belt having a plurality of ground engaging fingers extending therefrom and passing over a relatively low pulley and a relatively high pulley to cause ends of adjacent fingers to spread, one of said pulleys being mounted adjacent the ground with the fingers passing therearound in engagement with the ground, and the other one of said pulleys being elevated, an endless belt traveling transversely with respect to the direction of movement of the first mentioned belt and below the region where the fingers open as they pass around the second mentioned pulley, an air manifold mounted adjacent the last mentioned belt directing a stream of air thereon to remove leaves, debris and the like, and a third endless belt having a plurality of spaced flaps extending therefrom sweeping material off the last mentioned endless belt and raising it to an elevated position where it may be deposited into a receptacle.

2. In a harvester apparatus of the character described, an endless belt having a plurality of ground engaging fingers extending therefrom and traveling generally upwardly from a forward position on a wheeled vehicle to a rear position, an endless belt mounted under said fingers at the rear position traveling in a direction transverse to the travel of said vehicle, and an air duct means blowing a stream of air across said last mentioned endless belt to remove debris therefrom.

3. In a harvesting apparatus of the character described, a wheeled vehicle having ground engaging wheels, an endless belt driven by said ground engaging wheels in a plane extending generally upwardly from the front of the vehicle to an aft region, ground engaging fingers mounted on said belt and engaging the ground at the most forward end of the belt, a second endless belt driven by said wheels and traveling transversely to the direction of motion of said vehicle and in a region immediately below said aft region, stripper elements mounted on said vehicle dislodging harvested material from between rows of said fingers to allow the material to fall onto the second mentioned belt, air blowing means mounted adjacent the last mentioned belt removing debris therefrom, an inclined loading platform, a third endless belt driven by said wheels with flaps thereon sweeping the harvested material from said transversely extending belt onto said loading platform and propelling said material along said loading platform to a harvested position from where it may be collected.

4. In a harvesting apparatus of the character described, a wheeled vehicle having a pair of wheels, the forward end of the vehicle being counterbalanced about the axis of rotation of said wheels so as to allow it to engage the ground with slight pressure, said forward end having mounted thereon a pair of pulleys with an endless belt passing thereover, and ground engaging fingers extending from said belt and engaging the ground, each of said fingers including a universally yieldable spring rod having an integral enlarged conically coiled free end, the enlarged free ends of said fingers adapted to be displaced laterally thereby to embrace and resiliently retain objects lying on the ground, the normal spacing between said fingers being less than the size of said objects and the normal spacing between said spring rods being greater than said objects.

CHARLES E. LEPPER.

REFERENCES CITED

The following references are of record in the file of this patent:

UNITED STATES PATENTS

| Number | Name | Date |
|---|---|---|
| 553,753 | Hankey | Jan. 28, 1896 |
| 682,965 | Taylor | Sept. 17, 1901 |
| 689,800 | Hofermehl | Dec. 24, 1901 |
| 721,196 | Jeffreys | Feb. 24, 1903 |
| 1,297,907 | Rand | Mar. 18, 1919 |
| 1,332,495 | Graham | Mar. 2, 1920 |
| 1,650,796 | Kellogg | Nov. 29, 1927 |
| 1,859,980 | Mueller | May 24, 1932 |
| 1,921,651 | Behling | Aug. 8, 1935 |

FOREIGN PATENTS

| Number | Country | Date |
|---|---|---|
| 13,314 | Great Britain | June 15, 1903 |